No Printed Specification Available
Sheet 2 - 2 Sheets
C. C. Edday.
Fermenting Vats.
BEST AVAILABLE COPY
No. 62.
A. I. Nov. 28. 1842.
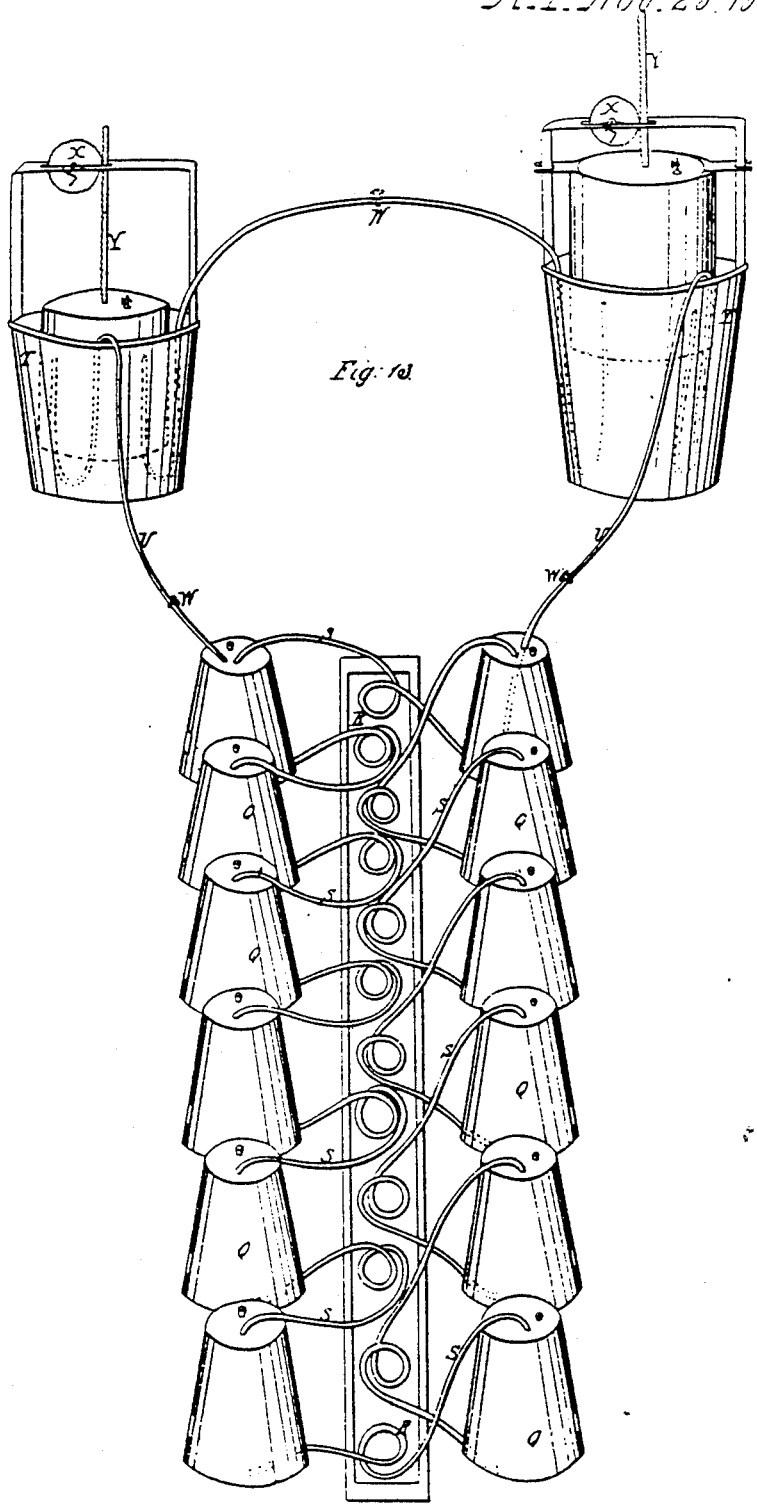
H. PETERS, PHOTO-LITHOGRAPHER WASHINGTON D. C.